United States Patent Office 3,514,406
Patented May 26, 1970

3,514,406
HALOGENATED BIPHENYLS
Robert H. Boschan and Donald H. Nail, Los Angeles, and James P. Holder, Woodland, Calif., assignors, by mesne assignments, to McDonnell Douglas Corporation, Santa Monica, Calif., a corporation of Maryland
No Drawing. Continuation of application Ser. No. 493,898, Oct. 7, 1965. This application June 20, 1968, Ser. No. 753,304
Int. Cl. C09k 3/02
U.S. Cl. 252—78                                  6 Claims

ABSTRACT OF THE DISCLOSURE

Fire resistant hydraulic fluid and lubricant consisting essentially of a mixture of a phosphate ester, e.g. a triaryl phosphate such as cresyldiphenyl phosphate, and a fluorochlorobiphenyl, e.g. trifluoropentachloro- or difluoropentachloro biphenyl.

This application is a continuation of application Ser. No. 493,898, filed Oct. 7, 1965, now abandoned.

This invention relates to a new class of halogenated biphenyls, and particularly with the provision of a novel class of fluorochlorobiphenyls. The invention is also directed to phosphate ester compositions containing fluorochlorobiphenyls, having particular utility as hydraulic fluids and lubricants.

The chlorinated biphenyls are known commercially available materials. Commercially available materials of this type are marketed as the "Aroclors." These Aroclors or chlorinated biphenyls are available in varying chlorine content up to about 68% of combined chlorine, corresponding approximately to chlorinated biphenyls containing up to about 8 chlorine atoms.

The chlorinated biphenyls have a variety of uses including, for example, utility as plasticizers and adhesive compositions, and as a component of hydraulic fluid compositions. The employment of such chlorinated biphenyls in hydraulic fluids is due chiefly to the high thermal stability and high fire resistance of the materials. However, these known chlorinated biphenyls have certain serious limitations with respect to their use in hydraulic fluids, particularly where such fluids are to be employed in hydraulic systems, for example, of aircraft. This is due to the fact that such chlorinated biphenyls and particularly those having from about 3 chlorine atoms or more have relatively high pour points, usually above or substantially above 0° F., and many of these chlorinated biphenyls, and particularly those of higher chlorine content are actually solids at temperatures substantially above 0° F. An important criterion for the utility of a hydraulic fluid, particularly for use in aircraft, is that such fluids have a wide liquid range, and most desirably having pour points and useful viscosity substantially below 0° F. Hence, it is highly desirable that the halogenated biphenyls employed as an essential component in such fluids have as low pour points as possible so as to substantially increase their utility in producing hydraulic fluids of enhanced liquid range and utility at the lower temperatures, for example, below 0° F.

We have made the discovery that fluorinated and chlorinated biphenyls can be provided having substantially lower pour points than the corresponding chlorinated biphenyls containing, for example, the same number of halogen atoms, and in addition such fluorochlorobiphenyls have enhanced thermal stability as compared to the corresponding chlorinated biphenyls. Due to these and other advantageous properties, the fluorochlorobiphenyls, and especially a certain class of fluorochlorobiphenyls having a range of combined halogen content and a certain distribution of chlorine and fluorine atoms as described in greater detail hereinafter, are particularly valuable for incorporation in phosphate esters, especially those hereinafter defined, for production of hydraulic fluids and lubricants having wide liquid range and high thermal stability, rendering them particularly suitable for use in aircraft hydraulic systems.

The number of fluorine and chlorine atoms which can be present in the fluorochlorobiphenyls according to the invention, can vary depending upon the properties of the fluorochlorobiphenyl products desired. Generally, an increase in the total number of halogen, that is, total fluorine and chlorine, atoms present in the product increases the fire resistance and thermal stability of the product, and the greater the number of fluorine atoms present generally the greater the thermal stability of the compound and the lower the pour point thereof. However, in preferred practice and for ease of preparation, the presence of a plurality of chlorine atoms in the fluorochlorobiphenyls is desirable. The fluorochlorobiphenyls useful in conjunction with phosphate esters to produce improved hydraulic fluids and lubricants according to the invention generally contain a maximum total of 9 chlorine and fluorine atoms and a minimum total of 2 chlorine and fluorine atoms. Such fluorochlorobiphenyls can contain from about 1 to about 8 fluorine atoms, and preferably from about 1 to about 5 fluorine atoms. A preferred novel class of fluorochlorobiphenyls are those which have a combined halogen (total chlorine and fluorine) content of at least about 50%, generally about 50 to about 65%, and contain a total of about 5 to about 8 chlorine and fluorine atoms. Often, those fluorochlorobiphenyls containing an approximately equal number of chlorine and fluorine atoms have a good balance of thermal stability and low pour point, together with relative ease of production. Mixtures of fluorochlorobiphenyls according to the invention, and containing different numbers of fluorine and chlorine atoms are often of value to obtain certain desired properties, particularly with respect to pour point and viscosity.

The fluorine and chlorine atoms can occupy various positions on the biphenyl nucleus. Thus, both symmetrical and unsymmetrical fluorochlorobiphenyls can be provided according to the invention. However, the unsymmetrical fluorochlorobiphenyls are usually more desirable since these materials generally have lower pour points and also higher thermal stability.

Fluorochlorobiphenyls which are preferred materials according to the invention are those containing (1) about 5 chlorine atoms and about 3 fluorine atoms; (2) about 5 chlorine atoms and about 2 fluorine atoms; (3) about 3 chlorine atoms and about 3 fluorine atoms; and (4) about 4 chlorine atoms and about 3 fluorine atoms. The empirical formulae of the above noted preferred materials of the invention, together with other specific examples of fluorochlorobiphenyls according to the invention are set forth below:

(1) $C_{12}H_2F_3Cl_5$
(2) $C_{12}H_3F_2Cl_5$
(3) $C_{12}H_4F_3Cl_3$
(4) $C_{12}H_3F_3Cl_4$
(5) $C_{12}H_5F_2Cl_3$
(6) $C_{12}H_4FCl_5$
(7) $C_{12}H_5FCl_4$
(8) $C_{12}H_4F_2Cl_4$
(9) $C_{12}H_3FCl_6$
(10) $C_{12}H_6F_2Cl_2$
(11) $C_{12}H_8FCl$
(12) $C_{12}H_7FCl_2$
(13) $C_{12}HF_4Cl_5$
(14) $C_{12}H_2F_4Cl_4$
(15) $C_{12}H_2F_2Cl_6$
(16) $C_{12}H_3F_4Cl_3$

3

The fluorochlorobiphenyls of the invention can be conveniently prepared by replacing a chlorine atom or chlorine atoms of the corresponding chlorinated biphenyl with one or more fluorine atoms. This replacement of the chlorine atoms of the chlorinated biphenyl with fluorine atoms is accomplished by an agent effective to produce such a substitution, examples of such agents being potassium fluoride (KF), silver fluoride (AgF) and antimony trifluoride ($SbF_3$). The reaction is carried out preferably in liquid phase employing suitable solvents, and preferably at elevated temperature, substantially as known in the art for affecting substitution of fluorine for chlorine in organic compounds.

Examples of preparation of representative fluorochlorobiphenyls according to the invention are set forth below.

EXAMPLE I

To a mixture of 105 g. (1.8 moles) of anhydrous potassium fluoride and 250 ml. of N-methyl-2-pyrrolidone were added dropwise with stirring a solution of 45.4 g. (approximately 0.1 mole) of a chlorinated biphenyl having approximately 68% chlorine, approximately corresponding to octachlorobiphenyl (Aroclor 1268), in 500 ml. of N-methyl-2-pyrrolidone. The temperature was maintained at 195–200° C. during the addition, which was complete in 1¼ hours. The mixture was then held at 200° C. for 16 hours.

The mixture was then cooled and poured into 1500 g. of ice, 200 ml. of chloroform were added, and the organic layer was removed. The aqueous layer was extracted with two 100 ml. portions and one 50 ml. portion of chloroform. The chloroform extracts were added to the organic layer, which was then dried over anhydrous magnesium sulfate, and the solvent was removed by heating on a steam bath. The residue was distilled at reduced pressure, the main product fraction, 23.4 g. (61.2% yield as $C_{12}H_2F_3Cl_5$) distilled at 90–146° C. (0.50–0.54 mm. mercury).

From the chemical analysis it was calculated that approximately 3 atoms of chlorine out of approximately 8 chlorine atoms in the original chlorinated biphenyl had been replaced by fluorine atoms.

*Analysis.*—Calc'd (percent): F, 13.74. Found (percent): F, 14.3

EXAMPLE II

To a mixture of 105 g. (1.8 moles) of anhydrous potassium fluoride and 200 ml. of N-methyl-2-pyrrolidone were added dropwise with stirring a solution of 38.7 g. (approximately 0.1 mole) of a chlorinated biphenyl having approximately 62% chlorine, approximately corresponding to heptachlorobiphenyl (Aroclor 1262), in 85 ml. of N-methyl-2-pyrrolidone. The temperature was maintained at 200° C. during the addition, which was complete in one hour. The mixture was then held at 200–208° C. for 47½ hours.

The mixture was then cooled and poured into 570 g. of ice, 200 ml. of chloroform were added, and the organic layer was removed. The aqueous layer was extracted with two 100 ml. portions of chloroform. The chloroform extracts were added to the organic layer, which was then dried over anhydrous magnesium sulfate, and the solvent was removed by heating on a steam bath. The residue was then distilled at reduced pressure; the main product fraction 17.2 g., distilled at 132–197° C. (0.21–0.26 mm. mercury).

From the chemical analysis it was calculated that approximately one to two chlorine atoms in the original chlorinated biphenyl had been replaced by fluorine, forming a mixture of $C_{12}H_3FCl_6$ and $C_{12}H_3F_2Cl_5$.

A comparison of the pour point and viscosity of the fluorochlorobiphenyl products of Examples I and II above with the fully chlorinated corresponding chlorobiphenyl (Aroclor) starting materials of the respective examples is set forth in the table below:

| | Pour Point (° F.) | Viscosity (centistokes) at 210° F. |
|---|---|---|
| Fluorochlorobiphenyl product of Example I | 65 | 6.91 |
| Corresponding chlorobiphenyl (Aroclor 1268) | Solid at 65 | Solid |
| Fluorochlorobiphenyl product of Example II | 55 | 5.51 |
| Corresponding chlorobiphenyl (Aroclor 1262) | 90 | 17.9 |

From the table above, it is seen that the fluorochlorobiphenyl products of Examples I and II have substantially lower pour points and viscosities as compared to the corresponding chlorobiphenyl starting materials containing an equal number of halogen (chlorine) atoms. Also, the fluorochlorobiphenyl products of Examples I and II above have substantially higher thermal stabilities as compared to the corresponding chlorobiphenyl starting material.

As previously noted, the fluorochlorobiphenyls produced according to the invention are particularly valuable for admixture with a phosphate ester base stock for production of hydraulic fluids and lubricants. Such hydraulic fluids not only have extremely high fire resistance but have operability over a wide liquid range including relatively low temperatures below 0° F., good lubricating properties, high thermal and chemical stability, relatively low pour point below 0° F. and good viscosity characteristics at high and low temperatures.

Especially suitable phosphates to which the fluorochlorobiphenyls of the invention can be added for producing particularly useful hydraulic fluids and lubricants having the above properties are the triaryl phosphates, preferably those in which the aryl radicals have from 6 to 8 carbon atoms; that is, such aryl radicals can be phenyl, cresyl or xylyl. Preferably, the total number of carbon atoms in all three of the aryl radicals is from 19 to 24, that is, the three aryl radicals include at least one cresyl or xylyl radical. Examples of such phosphates include tricresyl, trixylyl, phenyl dicresyl, and cresyl diphenyl phosphates. The triaryl phosphates are preferred for the best combination of properties particularly including high fire resistance properties. For relatively low viscosity at low temperatures, mono-alkyl diaryl phosphates can be used, e.g., those in which the aryl radicals can have from 6 to 8 carbon atoms and can be phenyl, cresyl or xylyl, preferably phenyl, and the alkyl radical can have from about 4 to about 12 carbon atoms. Examples of the alkyl diaryl phosphates include butyl diphenyl, amyl diphenyl, hexyl diphenyl, heptyl diphenyl, octyl diphenyl, and 6-methylheptyl diphenyl phosphates.

Although any of the fluorochlorobiphenyls noted above can be incorporated with the above phosphate esters to produce improved hydraulic fluids and lubricants according to the invention, best results can be achieved by admixing with such phosphate esters the above noted preferred novel class of fluorochlorobiphenyls containing at least about 50%, e.g., about 50% to about 65%, combined halogen content, and a total of about 5 to about 8 halogen atoms, and containing from about 1 to about 5 fluorine atoms.

Mixtures of the above phosphate esters and fluorochlorobiphenyls for use as hydraulic fluids according to the invention can contain from about 20 to about 80% of triaryl phosphate or of monoalkyl diaryl phosphate, and from about 80 to about 20% of fluorochlorobiphenyl, by weight.

The following are examples of specific hydraulic fluid compositions composed of a mixture of phosphate ester and fluorochlorobiphenyl according to the invention, these examples being illustrative only.

Composition A

| | Percent by weight |
|---|---|
| Tricresyl phosphate | 60 |
| Difluoropentachlorobiphenyl | 40 |

Composition B

| | |
|---|---|
| Heptyl diphenyl phosphate | 75 |
| Trifluoropentachlorobiphenyl | 25 |

Composition C

| | |
|---|---|
| Diphenylcresyl phosphate | 50 |
| Trifluorotrichlorobiphenyl | 50 |

All of the above compositions A, B and C provide good hydraulic fluids having wide liquid range both at elevated temperatures and at low temperatures below 0° F., good viscosity characteristics at both high and low temperatures, high thermal stability, high fire resistance and good lubricity and lubricating properties, and are substantially non-corrosive to metals such as aluminum, iron and brass employed in hydraulic systems.

From the foregoing, it is seen that the invention provides fluorinated and chlorinated biphenyls having outstanding properties particularly for use in the formulation of hydraulic fluids, and phosphate ester compositions containing such fluorochlorobiphenyls, forming improved hydraulic fluids and lubricants.

While we have described particular embodiments of our invention for the purpose of illustration, it should be understood that various modifications and adaptations thereof may be made within the spirit of the invention, and within the scope of the appended claims.

We claim:

1. A fire resistant hydraulic fluid and lubricant consisting essentially of a mixture of from about 20 to about 80% of a phosphate ester and from about 80% to about 20% of a fluorochlorobiphenyl, said phosphate ester being selected from the group consisting of triaryl phosphates in which the aryl radicals have from 6 to 8 carbon atoms and are selected from the group consisting of phenyl, cresyl and xylyl radicals, and the total number of carbon atoms is from 19 to 24, said fluorochlorobiphenyl having a combined halogen content of at least about 50%, and containing a total of about 5 to about 8 chlorine and fluorine atoms, and containing from about 3 to about 5 chlorine atoms and about 2 to about 3 fluorine atoms.

2. A fire resistant hydraulic fluid and lubricant as defined in claim 1, wherein said fluorochlorobiphenyl contains about 5 chlorine atoms.

3. A fire resistant hydraulic fluid as defined in claim 1, wherein said triaryl phosphate is tricresyl phosphate.

4. A fire resistant hydraulic fluid as defined in claim 1, wherein said triaryl phosphate is cresyldiphenyl phosphate.

5. A fire resistant hydraulic fluid as defined in claim 2, wherein said triaryl phosphate ester is tricresyl phosphate.

6. A fire resistant hydraulic fluid as defined in claim 2, wherein said triaryl phosphate is cresyldiphenyl phosphate.

References Cited

FOREIGN PATENTS

| 786,351 | 11/1957 | Great Britain. |
|---|---|---|
| 964,543 | 7/1964 | Great Britain. |

LEON D. ROSDOL, Primary Examiner

D. SILVERSTEIN, Assistant Examiner